United States Patent
Ancimer

(10) Patent No.: US 7,200,487 B2
(45) Date of Patent: Apr. 3, 2007

(54) SYSTEM AND METHOD FOR PROCESSING AN ACCELEROMETER SIGNAL TO ASSIST IN COMBUSTION QUALITY CONTROL IN AN INTERNAL COMBUSTION ENGINE

(75) Inventor: Richard Ancimer, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/283,156

(22) Filed: Nov. 18, 2005

(65) Prior Publication Data

US 2006/0106523 A1 May 18, 2006

Related U.S. Application Data

(63) Continuation-in-part of application No. 10/822,333, filed on Apr. 12, 2004.

(60) Provisional application No. 60/629,489, filed on Nov. 18, 2004, provisional application No. 60/483,855, filed on Jun. 30, 2003.

(51) Int. Cl.
*G01M 15/12* (2006.01)
(52) U.S. Cl. ...................... 701/111; 73/35.04
(58) Field of Classification Search ................ 701/103, 701/105, 107, 110, 111, 113, 114; 123/479, 123/480, 435, 501, 502; 73/116, 119 A, 73/35.03, 35.04, 117.2, 117.3, 118.1, 115
See application file for complete search history.

(56) References Cited

U.S. PATENT DOCUMENTS

| 5,050,566 A | 9/1991 | Distelrath et al. |
| 5,789,667 A * | 8/1998 | Leader et al. ................. 73/116 |
| 6,161,523 A | 12/2000 | Unland et al. |
| 6,273,064 B1 * | 8/2001 | Scholl et al. .......... 123/406.24 |
| 6,408,819 B1 | 6/2002 | Mezger et al. |
| 6,598,468 B2 | 7/2003 | Zur Loye et al. |
| 6,688,286 B2 | 2/2004 | Kokubo et al. |
| 6,840,218 B2 | 1/2005 | Scholl et al. |

FOREIGN PATENT DOCUMENTS

DE 40 02 228 A1 8/1991

(Continued)

OTHER PUBLICATIONS

Kim et al., "Cepstral Analysis As A Tool for Robust Processing, Deverberation And Detection Of Transients", *Mechanical Systems and Signal Processing*, 1992, pp. 1-15, vol. 6, No. 1.

Molinaro et al., "Signal processing pattern classification techniques to improve knock detection in spark ignition engines" (abstract), 1995, INSPEC/IEE, No. XP-002296503 (original published in *Mechanical Systems and Signal Processing*, Jan. 1995).

(Continued)

*Primary Examiner*—Andrew M. Dolinar
*Assistant Examiner*—Johnny H. Hoang
(74) *Attorney, Agent, or Firm*—McAndrews, Held & Malloy, Ltd.

(57) ABSTRACT

A method for processing an accelerometer signal associated with the combustion process in an operating internal combustion engine, the method comprising the steps of measuring an accelerometer signal across a window of selected crank angle degrees during a cycle of the engine, the measured accelerometer signal including a combustion acceleration component and a motored acceleration components; and applying a shape function to the measured accelerometer signal to reduce the motored acceleration component.

3 Claims, 6 Drawing Sheets

FOREIGN PATENT DOCUMENTS

| | | |
|---|---|---|
| DE | 43 41 796 A1 | 9/1995 |
| EP | 1106805 A1 | 6/2001 |
| JP | 02-221664 | 9/1990 |
| WO | WO 91/11602 | 8/1991 |
| WO | WO 95/16196 | 6/1995 |
| WO | WO 03/016698 A1 | 2/2003 |

OTHER PUBLICATIONS

Li et al., "Failure diagnosis system by sound signal for automobile engine"(abstract), INSPEC/IEE, No. XP-00223612 (original published in *Proceedings of the Japan-USA Symposium on Flexible Automation*, 1996, ASME, New York, NY, USA).

* cited by examiner

SYSTEM AND METHOD FOR PROCESSING AN ACCELEROMETER SIGNAL TO ASSIST IN COMBUSTION QUALITY CONTROL IN AN INTERNAL COMBUSTION ENGINE

CROSS-REFERENCE TO RELATED APPLICATION(S)

This application is related to and claims priority benefit from U.S. Provisional Application No. 60/629,489 filed Nov. 18, 2004 and entitled "Accelerometer-Based Combustion Sensor." The '489 application is hereby incorporated by reference herein in its entirety.

This application is a continuation-in-part of U.S. patent application Ser. No. 10/822,333 filed Apr. 12, 2004 and entitled "Method And Apparatus For Controlling An Internal Combustion Engine Using Accelerometers." The '333 application is related to and claims priority benefit from U.S. Provisional Application No. 60/483,855 filed Jun. 30, 2003, entitled "Method And Apparatus For Controlling An Internal Combustion Engine Using Accelerometers." The '333 and '855 applications are incorporated by reference herein in their entirety.

FIELD OF THE INVENTION

The present invention relates to a method and system for determining combustion quality in an internal combustion engine, and more particularly to the use of accelerometers in combination with digital signal processing (DSP) techniques for determining combustion quality, where combustion quality indicators include but are not limited to: (i) combustion phasing, including start of combustion (SOC) indicators, (ii) combustion rate, (iii) misfire or partial burn, and (iv) excessively fast cylinder pressure rise (knock).

BACKGROUND

Conventional internal combustion engines such as diesel or spark-ignited engines require controlling of combustion quality features such as the SOC for both efficiency and emissions control. For example, the diesel engine controls the start of combustion by the timing of fuel injection while a spark-ignited engine controls the start of combustion by the spark timing.

However, additional combustion control may be desirable on conventional engines and required on other engines. An example of an engine that benefits strongly from a feedback combustion quality sensor is one that runs using HCCI type combustion. Unlike a traditional SI or diesel engine, HCCI combustion takes place spontaneously and, in general, homogeneously without flame propagation. HCCI combustion is the compression ignition of a relatively well-premixed fuel/air mixture. Various combustion strategies based on the HCCI principle have been developed. For example, the combination of an HCCI engine with traditional engine injection technology led to Premixed Charge Compression Ignition (PCCI) where the fuel/air mixture is premixed, but not necessarily homogeneous. An additional combustion strategy is a strategy that supplements the energy provided by a PCCI combustion event with a directly injected quantity of fuel generally provided once combustion has commenced. This type of engine is known as a premixed charge direct injection (PCDI) engine.

One problem with HCCI engines is that the combustion quality is sensitive to a large number of parameters including intake manifold temperature, fuel/air ratio, fuel quality, trapped residual gas fraction and exhaust gas recirculation quantity, amongst others. Without control over the parameters that impact combustion quality, large cycle-to-cycle variations in combustion quality will be encountered. Thus, in as compared to conventional diesel and SI engines, misfires and excessively fast rates of pressure rise are apt to occur. Knowledge of the time of commencement of combustion, that is SOC or, as it is sometimes referred to, combustion phasing, can help provide a control strategy that adjusts combustion quality in future engine cycles to allow for improved performance of the engine. Thus HCCI-type engines benefit from more accurate and robust determination of SOC and other indicators of combustion quality.

Aside for the HCCI example provided above, knowledge of the combustion quality, such as start and rate of combustion, is becoming commercially beneficial for diesel and SI engines if for no other reason than to monitor performance of the system for real time diagnostic purposes. Corrective actions can be taken with such engines to compensate for measured changes in combustion quality to maintain high engine fuel economy and low engine out emissions.

A known technique for estimating the combustion quality of an engine cycle relies on direct pressure measurement within the combustion chambers; for example, by positioning a sensor to measure the deflection of a diaphragm in contact with the in-cylinder pressure. The measured pressure signal is correlated to a SOC or other combustion quality indicator. For example, a feedback control loop is used to adjust engine parameters to influence the SOC in future engine cycles by minimizing the error between the measured SOC and a target SOC. See U.S. Pat. No. 6,598,468 and German Patent No. 4341796.5 which describe direct measurement of a signal indicative of pressure within the combustion chamber. Typically, an optical sensor, or other direct pressure measurement instrument, is used. While fairly accurate indicators of combustion quality, such sensors are expensive and/or currently lack the reliability and robustness (due to the harsh environment within a combustion chamber) required for many applications.

Another technique for estimating the combustion chamber pressure uses a knock sensor (accelerometer), such as described in U.S. Pat. No. 6,408,819. While accelerometers tend to be less expensive, and currently more reliable and more robust, than direct pressure measuring sensors, a drawback is that this technique relies on a method of reconstructing a pressure signal that is not sufficiently accurate for many combustion quality control methods including effective SOC control.

A more effective system using accelerometers is described in the applicant's co-pending U.S. application Ser. No. 10/822,333 ("'333") filed Apr. 12, 2004, entitled "Method And Apparatus For Controlling An Internal Combustion Engine Using Accelerometers", and incorporated by reference herein in its entirety. Rather than reconstructing a pressure signal from the accelerometer data, the '333 application describes a heat release rate reconstruction (HRR) method to extract combustion information from raw accelerometer data.

It was investigated whether the effectiveness of the above mentioned technique could be improved.

SUMMARY OF THE INVENTION

In view of the foregoing, the presently described technology seeks to provide an improved method and system for determining the combustion quality including SOC in an internal combustion engine and wherein the new method and system can be used more effectively in various engine applications such as combustion control or combustion diagnostics.

This can be achieved by additional preprocessing of raw accelerometer data.

An advantage of the presently described technology is the preprocessing improves the quality of the data fed into the heat release reconstruction method, resulting in a more robust, reliable, low-cost combustion sensor.

Another advantage of the presently described technology is that it provides real time estimation of combustion quality and SOC.

To permit effective determination of the SOC using an accelerometer sensor, the applicants have found that there are advantages to separating from raw accelerometer data, data that relates to combustion, prior to reconstructing the heat release rate and correlating the data to a SOC. This technique is useful because accelerometers, which are mounted in appropriate locations on an engine to pick up vibrations associated with the combustion process, include data due to the motion of the engine components as well as combustion process.

Accordingly, the presently described technology provides a method and apparatus for processing accelerometer data to extract data that relates to combustion.

In accordance with the presently described technology there is provided a method for processing an accelerometer signal associated with the combustion process in an operating internal combustion engine, the method comprising the steps of:
 a. measuring an accelerometer signal across a window of selected crank angle degrees during a cycle of said engine, the measured accelerometer signal including a combustion acceleration component and a motored acceleration components; and
 b. applying a shape function to said measured accelerometer signal to reduce said motored acceleration component.

In a further embodiment the shape function is estimated by operating said engine in a motored mode.

In another embodiment a pivoting technique is applied to the shape function before being applied to the measured accelerometer signal.

In another embodiment a reflection technique is applied to the difference between the shape function and the measured accelerometer signal.

In another embodiment a differentiation technique is applied to the difference between the shape and the measured accelerometer signal.

In accordance with a further embodiment of the presently described technology, there is provided a system for controlling combustion in a charge compression ignition engine wherein accelerometer signals are fed into DSP-chip based micro-controller, and where the method steps are performed in the DSP controller to produce the combustion information.

BRIEF DESCRIPTION OF THE DRAWINGS

The foregoing and other objects, features and advantages of the presently described technology will be apparent from the following more particular description of preferred embodiments of the presently described technology, as illustrated in the accompanying drawings in which like reference characters refer to the same parts throughout the different views. The drawings are not necessarily to scale, emphasis instead being placed upon illustrating the principles of the presently described technology.

DETAILED DESCRIPTION OF THE PREFERRED EMBODIMENTS

The presently described technology is directed to a method and apparatus for determining the combustion quality in an internal combustion engine using accelerometer data. In general, for the purposes of this disclosure, combustion quality such as the misfire, rate of combustion, peak cylinder pressure, combustion phasing (for example, SOC) can be measured using the disclosed method. One benefit of measuring the combustion quality is to provide a measure of engine performance to enable the ability to adjust the engine behavior in real time to allow improve efficiency while reducing emissions. It should be noted that the apparatus and methods in accordance with the presently described technology disclosed herein below can be applied to various different internal combustion engines including (but not limited to) diesel engines, spark-ignited gasoline engines, alternative fuel engines, and variations thereof which may operate in a modified thermal cycle. The presently described technology can be used in many of such engines to determine and monitor combustion quality to thereby facilitate improved engine efficiency, reduce emissions, or for other uses, such as combustion diagnostics.

More specifically, the presently described technology relates to improvements in accelerometer-based methods for determining combustion quality such as SOC, which were previously described in the '333 application. Embodiments of the presently described technology relate to refinements in processing the raw accelerometer data to improve accuracy and robustness, as described below.

Furthermore, while much of this discussion herein refers to methods directed at monitoring or determining SOC, the accelerometer data and the resulting processed heat release trace derived from such data is, as would be understood by a person skilled in the technology involved here, applicable to methods of controlling or assessing aspects of combustion quality, including, but not limited to, peak cylinder pressure, location of peak cylinder pressure, rate of combustion, combustion phasing, misfire, and premature combustion.

Figure 1:
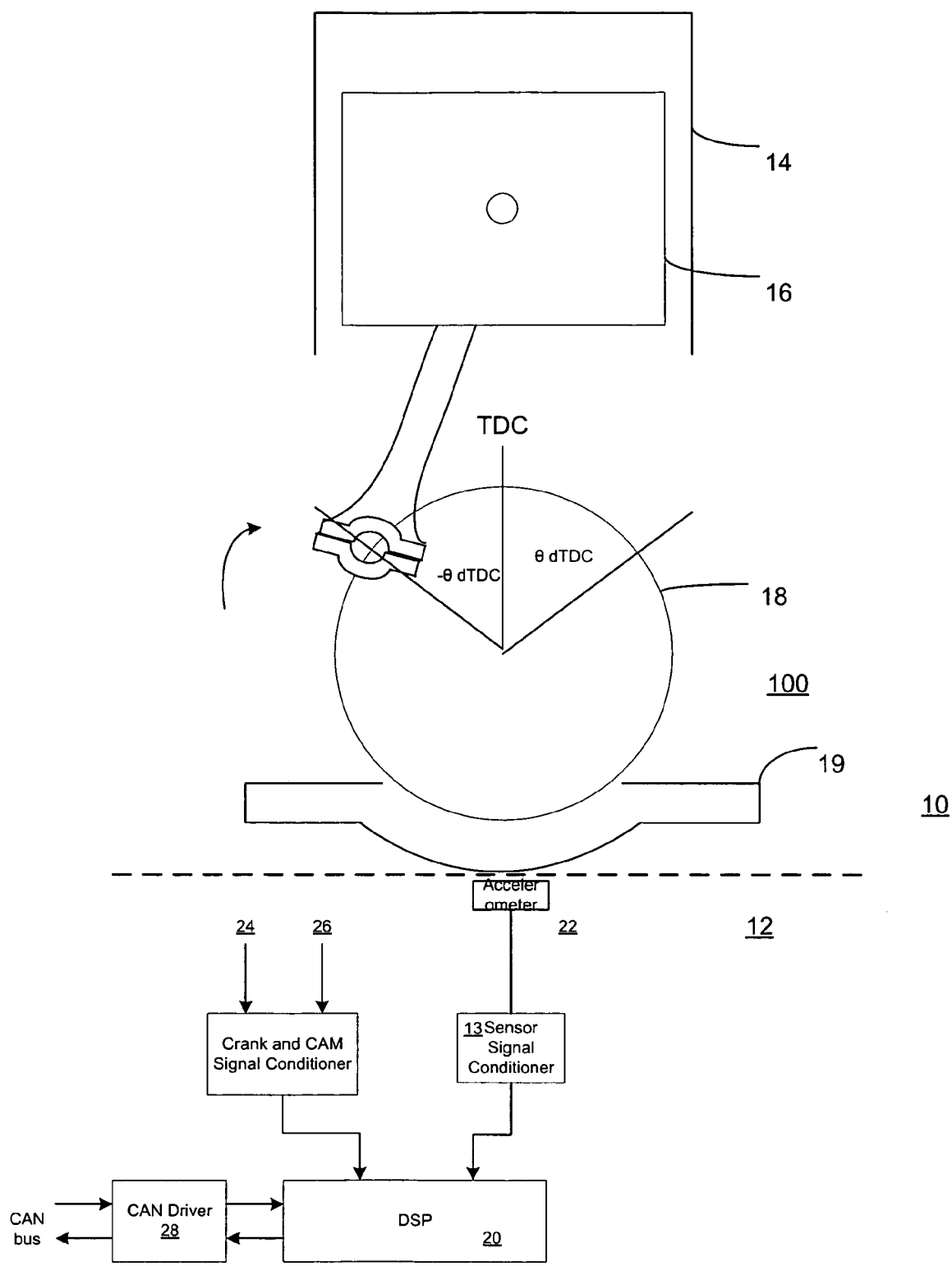
FIG. 1 is schematic diagram of combustion control system according to an embodiment of the presently described technology.

Referring now to FIG. 1, an engine 100 is shown to which embodiments of the presently described technology can be applied. The engine 100 includes a cylinder block (for simplicity only one cylinder is shown although the engine typically will have two or more cylinders) having a cylinder 14 and a reciprocating piston 16 disposed therein for driving a crankshaft 18. Various intake and exhaust valves (not shown) communicate with the cylinders to deliver charge to the cylinders and exhaust byproducts, as the engine can also include fuel and air deliver systems, and other standard systems associated with internal combustion engines.

The engine 100 includes an accelerometer 22 preferably mounted on the main bearing cap 19 of the engine 100. The accelerometer provides an electrical signal associated with the deflection of the bearing cap due to the pressure on the piston 16. Referring to FIG. 1 there is also shown an exemplary combustion quality processing system 12 for processing the accelerometer 22 signals, in accordance with embodiments of the presently described technology as will be described below. The processing system 12 comprises a signal-conditioning block 13; a digital signal processing (DSP) based micro-controller 20 having input channels to process data from the accelerometer 22. It should be understood that SOC refers to time or location at which combustion starts within the cylinder. Generally, the SOC is referenced with respect to the angular location of an engine crankshaft. Consequently, in the disclosed embodiments, the engine 100 is also provided with an engine position sensor (not shown) and an engine speed sensor (not shown), which monitor the angular position and rotational speed of the engine crank shaft 18. The SOC is referenced with respect to the crankshaft location. However, in other embodiments of the presently described technology, the SOC can also be referenced to another parameter such as time, both time and crank shaft location, or some other parameter and various other sensors and optionally, in-cylinder pressure transducer sensors (not shown). In a preferred embodiment, the DSP controller is able to sample each channel at a minimum sampling frequency of 20 kHz, with the processing of a single channel in 7.5 ms. Signals 24,26 from the crank and cam shaft sensors are provided to the DSP 20 to enable crank synchronous sampling of signals from the accelerometer 22. Although not necessarily part of the presently described technology, there is shown a CAN (Controller Area Network) interface 28 to a CAN bus 29. A main engine controller (not shown) receives signals from the DSP via the CAN bus and implements a PI controller to control various parameters of the engine as is well known in the art and described, for example, in the '333 application. It should be noted that the DSP processing system 12 can also be integrated within the main engine controller to obviate the need for the transmission of the results over the CAN.

In operation, the DSP-based combustion quality processing system 12 starts its analog to digital (AD) sampling of accelerometer sensor signals based on a user defined crank degree θ at the sampling frequency $f_{SR}$. After sampling is complete, the controller carries out the signal processing algorithms. Typically, the time of calculation is less than 10 ms per cycle per cylinder. The calculation results are passed to the main controller via the CAN bus. The main controller can then use the information for diagnostic purposes, for closed loop control on the individual cylinder SOC, or for many other purposes deemed generally related to combustion quality.

In the following description the term motoring mode simply refers to engine cycles wherein no fuel is injected and no combustion occurs.

Figures 2A, 2B:
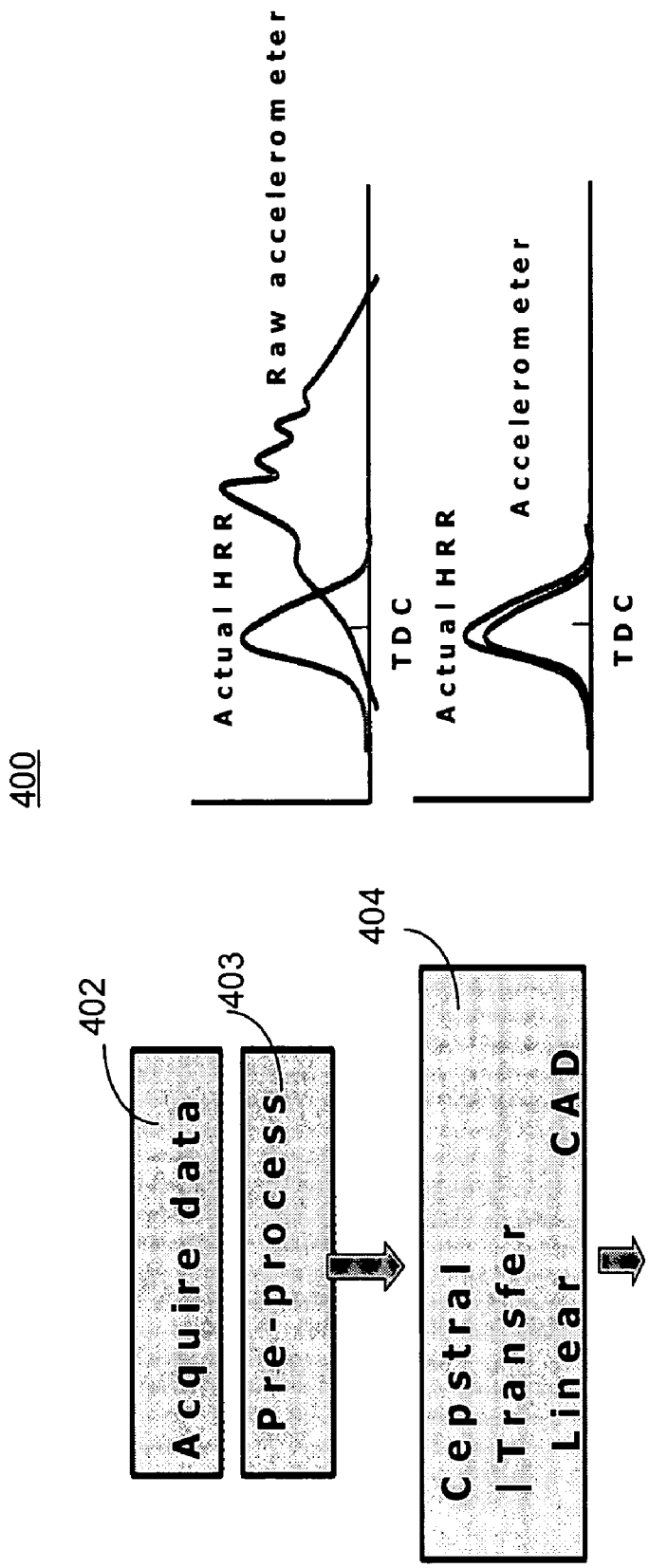
FIG. 2A is a flow chart of steps for processing an accelerometer signal according to an embodiment of the presently described technology.
FIG. 2B show signals at each step in FIG. 2A.

Referring to FIG. 2A there is shown a flow chart 400 of the general steps in an improved method for processing accelerometer 22 signals by the DSP 20 for combustion quality control, according to an embodiment of the presently described technology. FIG. 2B shows graphically the signals corresponding to each step. The method includes acquiring the sensor data at step 402, preprocessing the data at step 403, applying at step 404 Cepstral smoothing and a transfer function to the preprocessed sensor data to compute a HRR trace signal, and extracting combustion quality information from the computed HRR trace signal. The preprocessing steps 403 will be the focus of this disclosure.

Figure 3:
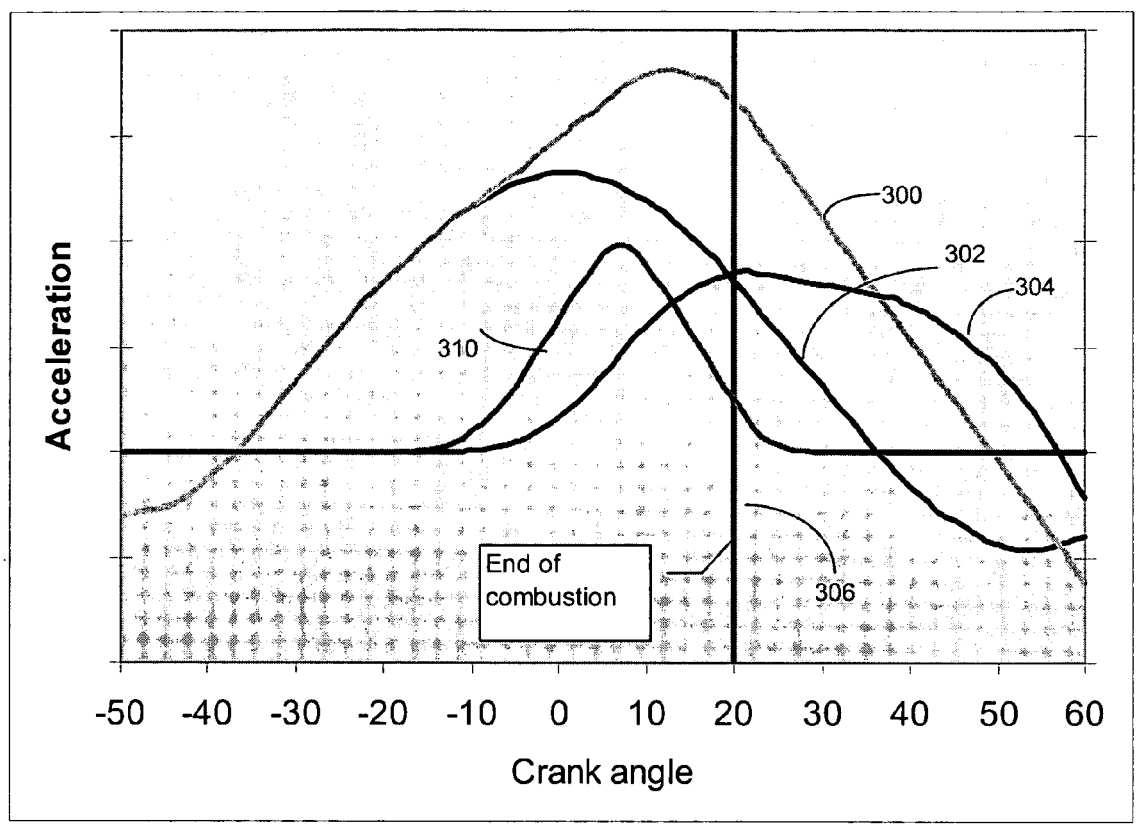
FIG. 3 is a graph representing accelerometer data.

FIG. 3 shows a plot of a typical raw accelerometer signal 300 measured at step 402 by an accelerometer 22 mounted on the main bearing cap of the engine 100. A plot 310 of the heat release rate is assumed to have occurred during the engine cycle. As shown the accelerometer signal 300 is determined over a window of crank angle degree between −50 dATDC and +60 dATDC. The crank angle window is focused on the combustion event timing for a cycle of the engine. The raw accelerometer signal 300 is considered to have two main components. First, there is an underlying signal 302 associated with the accelerations caused by the motoring pressure variations in the cylinder, referred to as the motored acceleration component. Second, there are accelerations associated with the additional pressure on the piston caused by the combustion signal 304, referred to as the combustion acceleration component out of which such information as the heat release trace 310 can be extracted. Other components are found in the data, however, motored acceleration component and combustion acceleration component are considered to dominate the signal in the sample range selected. In general, combustion is complete sometime after TDC. After this time, combustion is not contributing to a pressure increase over and above that associated with the piston motion during the power stroke. The raw accelerometer 300 and motored acceleration component 302 converge, with the raw accelerometer signal 300 decay rate slightly higher than the motored acceleration component 302 decay rate. Subtraction of the motored acceleration component from the raw accelerometer signal results in a signal referred to as a difference signal 304. The difference signal 304 is associated with the accelerations due to the combustion acceleration component. Note the approximately flat difference acceleration component 304 response after combustion 306 is near completion. The information contained in the accelerometer signal 300 before the end-of-combustion point 306 (shown at +20 dATDC, in this embodiment) is a measure of the impact of the total combustion acceleration component. There is limited information on the rate of combustion after the end-of-combustion point 306. Processing methods have been developed to remove as much of the non-combustion rate information from the raw accelerometer signal 300 prior to applying the Cepstral smoothing and reconstruction technique described and referenced previously in the '333 application. There are benefits to using preprocessing approach described above. First, the combustion acceleration component to noise ratio is improved significantly. A second by-product is that the application of the preprocessing techniques obviates the need to process a large data sample set (from well before TDC to well after TDC) to reduce the effect of non-zero edges. Such a reduced sample set decreases the computation time.

Embodiments of the presently described technology as described herein show pre-processing methods for removing the underlying trend in the data associated with the piston motion. The preprocessing methods of the presently described technology include defining a shape function that emulates the motored acceleration component 302, shown in FIG. 3. The shape function, in general, matches the accelerometer signal 300 when the engine is in a motoring mode.

The difference 304 between the matched shape function 302, indicative of the motored acceleration component, and the raw accelerometer signal 300 result in a accelerometer data set with a more dominant combustion acceleration component for a given cylinder, i.e., much of the underlying piston motion signal, motored acceleration component, is removed.

The motored acceleration component is acquired during a calibration process for given engine to determine an appropriate shape function. The data is determined from a cylinder at different engine operating conditions. Different engine operating conditions include different engine rotational speeds, loads or cylinder pressures. The phase of the motored acceleration component can shift by a number of degrees depending on such factors as cylinder pressure, engine speed and engine load. Preferably, one shape function is used per cylinder over most engine-operating conditions.

In one embodiment, a method to adaptively adjust the shape function to correctly match the motored acceleration component over most engine-operating conditions is desirable. A method to adaptively adjust shape function phasing, or to predict what shape function should be used for a given raw accelerometer signal 300; can be applied as is described below.

In a further embodiment, the shape functions can be determined dynamically or in a real-time basis. For example the engine could be periodically misfired by the operator and a motored measurement could be taken. Typically, retarding combustion in a controlled way and during the compression stroke determining where the peak of the measured motor function was performs this. This could be done in a manner that was transparent to the operator.

In yet another embodiment, determining the shape functions on a real time basis is used in combination with the adaptive adjustment of shape function phasing.

Figure 4A:
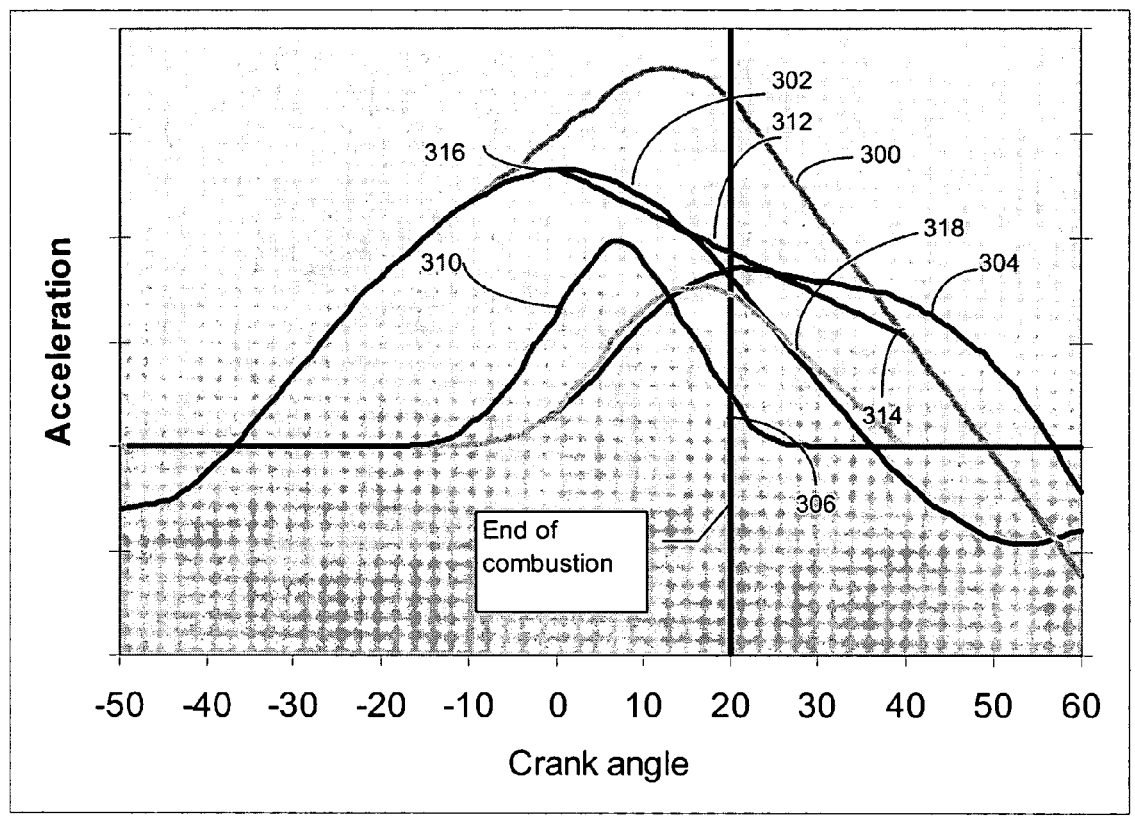
FIG. 4A is graph representing processed accelerometer data according to one embodiment of the presently described technology.

Referring to FIG. 4A, the first such technique for preprocessing accelerometer signals is demonstrated, and is described herein as a pivot method. It is assumed that both the measured raw acceleration signal 300 data and the motored acceleration component 302 are determined as described earlier. The preprocessing of the signal occurs in step 403 of FIG. 2. First, the shape function is preferably matched to the raw accelerometer signal 300 before the shape function can be subtracted from the raw signal. The accelerometers 22 generate a data set over the piston motion range from approximately −40 dATDC through TDC where nearly all of the data results from piston motion alone, i.e., in general, prior to combustion within the combustion chamber. Thus, the crank degree range where the shape function is matched to the raw data is done in the compression stroke, more specifically between −40 dATDC and TDC. The matching is carried out as follows:

i. The raw accelerometer signal and shape function representative of the motored acceleration component are pegged to zero at a fixed crank degree (for example, −30 dATDC);
ii. The slopes of the raw accelerometer signal data and shape function during the compression phase are calculated (for example, between −25 to −15 dATDC). A raw accelerometer zero crossing point and a shape function zero crossing point are then calculated. The zero crossing points are calculated by extrapolating from a point within the range of crank angles where the respective slopes were calculated. For example, if the slopes were calculated between −25 and −15 dATDC, then a line 312 starting at −20 dATDC is extrapolated down to cross the zero line.
iii. The shape function is phase shifted so that the zero crossing points of the raw accelerometer signal data and shape function coincide. For robustness, the phase shift of the shape function is limited. A typical limit of ±2 or ±3 crank degrees can be used.
iv. The raw accelerometer signal data and shape functions are again pegged to zero at a fixed crank degree (for example, −30 dATDC);
v. A gain is applied to the shape function to match the magnitude of the raw accelerometer signal data at a fixed angle before TDC (for example, −10 dATDC)

Figure 4B:
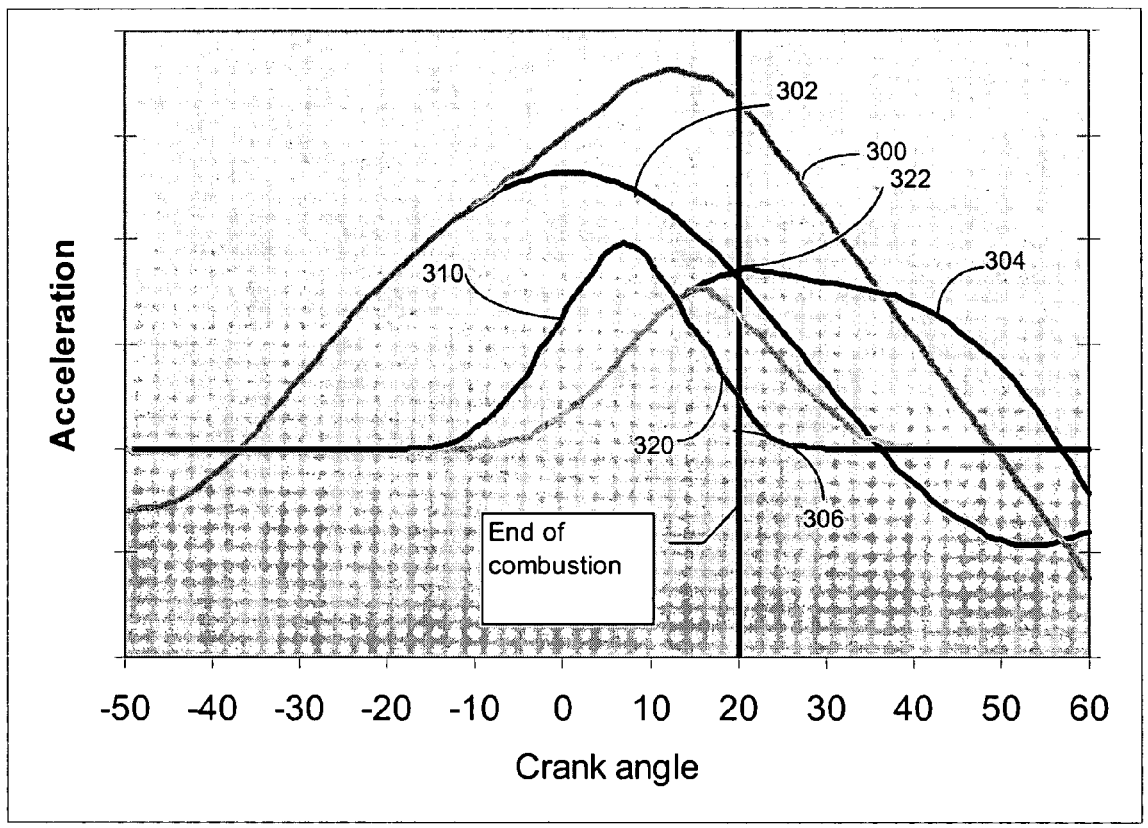
FIG. 4B is graph representing processed accelerometer data according to another embodiment of the presently described technology.

The difference between the raw accelerometer signal data and the matched shape function is then calculated. An example of the results from shape function matching is demonstrated in FIG. 4A. The results show matching during the compression stroke. The front end of the resulting difference signal 304 contains information related to the combustion rate, however, the tail end of the difference signal 304 contains information mostly associated with movement of the piston. Processing techniques disclosed herein extract the combustion rate related information from this difference signal. The pivot method is used to force the shape function to cross the raw accelerometer signal data at 40 dATDC, indicated by reference numeral 314 in FIG. 4A. Interpolation is used to maintain a smooth shape function where a pivot point 316 on the shape function 302 near TDC is identified. Interpolation is used to fill in the shape function vector between the pivot point 316 (TDC) and crossing point 314 (40 dATDC). The resulting pivot difference curve 318 (difference between the raw data and the pivoted shape function curve) is shown in FIG. 4A, which is more representative of a target heat release rate curve 310. In some instances, however, the non-combustion related information, such as the motored acceleration component, might also be removed by employing a second method, referred to herein as the reflection method. Here, the leading edge of the accelerometer combustion component is reflected around a predefined point on the difference signal data. The result is a symmetric accelerometer combustion component profile, to which the transfer function can be applied to reconstruct the heat release rate. Accordingly, FIG. 4B graphically shows the reflection method. Again it is assumed that both the raw acceleration signal 300 and the motored signal 302, shape function, are acquired in a manner as described earlier. A peak 322 on the difference curve 304 (difference between the measured 300 and motored signal 302) is determined. Note that a search for the peak is done in a limited preselected crank angle range. A limited window range is used to improve computational efficiency and to prevent noise from impacting the results by identifying a "false" peak. The window is preferably wide enough to cover the range of expected combustion phasing. The range of −10 dATDC through to +20 to +30 dATDC is a generally appropriate range however, a person skilled in the technology involved here would understand, the range can vary from engine to engine or application to application. A location in time (crank angle) associated with a fraction of the value associated with the peak 322 is calculated. The chosen fractional value (a) should be small enough to remove the uncertainty in peak location associated with a relatively flat signal with some noise; and (b) large enough such that a significant amount of combustion information is not lost. Appropriate fractions can range from 50% to 99% where preferably a value of 90% is chosen. The points on the difference curve 302 preceding the 90% point are then reflected about this point to create a symmetric combustion related acceleration curve. In addition an averaging filter can be applied to the upper portion of the reflected curve around the peak to round off the peak. This method works well for HCCI type engines.

Figure 4C:
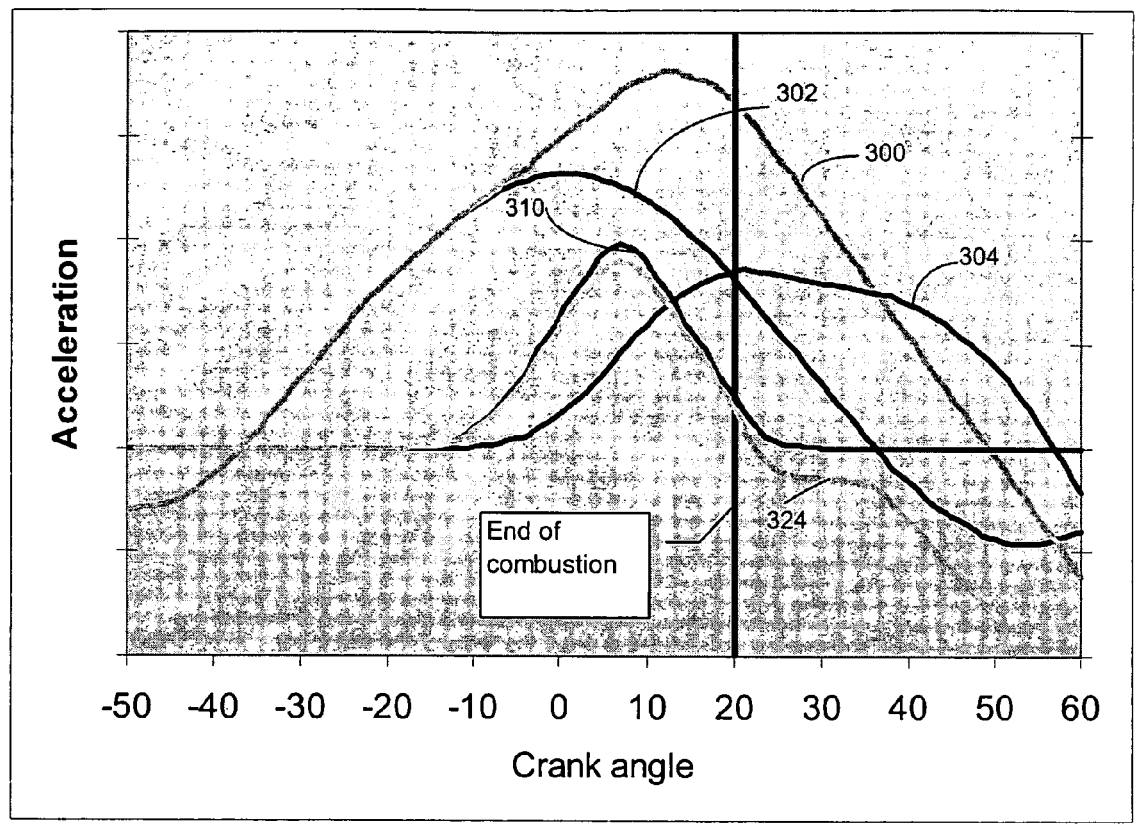
FIG. 4C is graph representing processed accelerometer data according to a further embodiment of the presently described technology.

In a further embodiment of the presently described technology, non-combustion related information might also be removed by employing a differentiation method. As with the other two methods described above, this method is applied to the difference curve 304. The difference curve 304 shown in FIG. 3 can be differentiated to derive a curve that is similar to the integrated heat release rate 310. The results of this method are shown graphically in FIG. 4C. Differentiating the difference curve 304 derives the differentiated curve 324 where the differentiation method removes the influence of the end effects mentioned earlier. Note that the differentiating method includes a number of steps to ensure robustness. First, a filter is applied to the raw accelerometer signal data to ensure a relatively smooth result upon differentiation of the difference signal. To reduce the impact of the filter on the phase information, a finite impulse response-type filter is preferred. The number of poles and values associated with the poles of the filter result in a trade-off between cut-off frequency, transition region length, band-pass ripple and computation time. By way of example, a 19-pole filter where the values of the filter taps were based on a Gaussian-type decay (that is, the decay was proportional to exp $\{-(x/\sigma)^2\}$, where x denotes the distance of the tap from the centre of the filter and $\sigma$ was chosen to ensure the edges of the filter were associated with x values between 2 and 3 times the value of $\sigma$) works well with little influence on the phase information, while at the same time the differentiated signal remained relatively smooth.

Second, it was found that mismatch between the shape function and the raw accelerometer signal data introduced errors in the estimation of the early stage heat release rates. These problems manifest because a single shape function is used for nearly all speed and load conditions, where the slope of shape function might not exactly match the slope of the raw accelerometer data signal near top dead centre. For the pivot and reflection techniques, the mismatch is simply a reduction in the signal to noise ratio. However, for the differentiation method, the problem is exacerbated because the differentiation amplifies the effect of the mismatch. A method was developed to circumvent this issue. The method involves using the location of the peak in the differentiated signal as a reference point. Information at a fixed time or crank degree interval before the location of the peak was set to zero. This method works well when used in combination with the Cepstral smoothing method noted in the '333 application. Other methods can also be used to solve this problem. For example, the entire differentiated signal can be offset downwards based on a threshold value to remove the impact of the early mismatch. The method using the location of the peak as a reference point is preferred method.

The above techniques may introduce robustness issues. For example, under nominal combustion conditions, the magnitude of the first peak associated with the mismatch is a fraction of the magnitude of the main peak corresponding with combustion. In general, the first peak is in the range of 10% of this main peak. However, when the combustion phasing is retarded or advanced relative to nominal combustion the magnitude of the main peak begins to decrease while the magnitude of the mismatch peak remains relatively constant or the main peaks additively interfere with the first peak. In either case, the peak associated with combustion can be more difficult to identify. In general, if the absolute magnitude of each peak is less than a threshold value, then the engine is considered to have misfired. However, if the absolute magnitude is above this threshold, and the magnitude of first peak is less than a predetermined ratio of the magnitude of the second peak, then the second peak is chosen as the reference location as described above. By way of example, typically, a first peak with a relative magnitude of 75% or less of the magnitude of the second peak will cause the second peak to be chosen as the reference location. However, if the relative magnitude is above this threshold level—75% in the example provided— then the first peak will usually be chosen.

Figure 5:
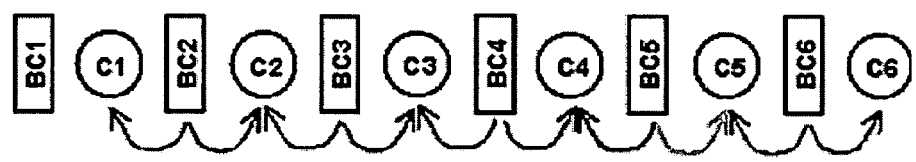
FIG. 5 is a schematic diagram showing bearing cap selection according to an embodiment of the present presently described technology.

Other techniques can also be used to compensate for the non-combustion related acceleration information. For example, a model based method could be used to predict the rate of decay for a given accelerometer signal The next step in the processing is to construct the HRR from the signal derived by one of the above-described preprocessing methods: i.e., pivot method, reflection method and differentiation method. A schematic of the main bearing caps and the cylinders is shown in FIG. 5. There are two bearing caps available for each cylinder. One potential issue is whether firing order impacts the cylinder-bearing cap pairing. It was found, in general, that most bearing cap/ cylinder combinations will provide usable combustion quality information. The shape function selection is preferably carried out for each bearing cap/cylinder combination selection. In addition, care should be taken to ensure the signal quality is acceptable, i.e., relatively high signal to noise ratio. For example, noise spikes may be observed within the combustion events where observed for certain cylinder-/ bearing cap combinations. On a second engine, the signal from a particular bearing cap can have in-phase low frequency fluctuations not associated with the motoring or combustion process. The low frequency fluctuations could be in phase, but with some phase jitter. In each case above, the result in usually an unacceptably low signal to noise ratio. Thus, care should be taken when selecting bearing cap/cylinder combinations. For redundancy purposes, it can be advantageous to mount two sensors on the bearing caps that provide acceptable combustion information for the two adjacent cylinders.

In summary, four-step method was described to extract combustion information from the raw accelerometer data, as follows. First, the measured accelerometer signal is broken down into combustion and motored acceleration (shape function) components. Second, the heat release rate is reconstructed from the combustion component using a transfer function. The last two steps involve extracting combustion quality information from the reconstructed heat release. Preprocessing methods were used to remove much of the non-combustion related information resulting in a noticeable improvement in the SOC prediction. The accelerometer-based SOC control system capability has been demonstrated on an HCCI engine. The accelerometer based control system has similar capability as in-cylinder pressure sensor-based SOC control systems. The algorithms developed result in usable and robust estimates of combustion phasing.

While particular elements and embodiments of the presently described technology have been shown and described, it will be understood, of course, that the presently described technology is not limited thereto since modifications can be made by those skilled in the technology involved here without departing from the scope of the present disclosure, particularly in light of the foregoing teachings.

What is claimed is:

1. A method for processing an accelerometer signal associated with the combustion process in an operating internal combustion engine, the method comprising the steps of:
   a) measuring an accelerometer signal across a window of selected crank angle degrees during a cycle of said engine, the measured accelerometer signal including a combustion acceleration component and a motored acceleration components; and
   b) applying a shape function to said measured accelerometer signal to reduce said motored acceleration component.

2. A method as defined in claim 1, including a preprocessing step selected from one of:
   a) pivoting said shape function prior to said applying step;
   b) in said applying step, determining a difference signal between said measured accelerometer signal and said shape function and reflecting a portion of said difference signal about a predetermined crank angle to extract said combustion component;
   c) in said applying step, determining a difference signal between said measured accelerometer signal and said shape function and differentiating said difference signal to extract said combustion component.

3. A method as defined in claim 2, including a step of applying a phase shift to said shape function prior to said preprocessing step.

* * * * *